United States Patent [19]
Yamaguchi

[11] Patent Number: 5,745,255
[45] Date of Patent: Apr. 28, 1998

[54] ELECTROPHOTOGRAPHIC DIGITAL PRINTER HAVING DATA EXPANSION MEANS RESPONSIVE TO DESIRED IMAGE QUALITY AND TYPE OF RECORDING MEDIUM USED

[75] Inventor: Chiseki Yamaguchi, Tokyo, Japan

[73] Assignee: NEC Corporation, Tokyo, Japan

[21] Appl. No.: 649,545

[22] Filed: May 17, 1996

[30] Foreign Application Priority Data

May 18, 1995 [JP] Japan ................... 7-120266

[51] Int. Cl.$^6$ .................................... H04N 1/41
[52] U.S. Cl. .................. 358/426; 358/434; 347/16; 399/45; 399/138; 395/114
[58] Field of Search ................... 358/426, 434, 358/444, 447, 448; 399/45, 138; 347/14, 16; 395/114, 112, 109, 101

[56] References Cited

U.S. PATENT DOCUMENTS

| | | | |
|---|---|---|---|
| 4,124,871 | 11/1978 | Morrin II | 358/444 |
| 4,516,135 | 5/1985 | Todoh . | |
| 4,617,580 | 10/1986 | Miyakawa | 347/14 |
| 5,432,891 | 7/1995 | Onodera | 395/114 |
| 5,486,903 | 1/1996 | Kanno et al. | 399/45 |
| 5,504,506 | 4/1996 | Noaki | 347/14 |
| 5,557,427 | 9/1996 | Kamiya | 399/45 |

FOREIGN PATENT DOCUMENTS

| 0642260 | 3/1995 | European Pat. Off. . |
| 0660589 | 6/1995 | European Pat. Off. . |

Primary Examiner—Peter S. Wong
Assistant Examiner—Derek J. Jardieu
Attorney, Agent, or Firm—Sughrue, Mion, Zinn, Macpeak & Seas, PLLC

[57] ABSTRACT

An expansion unit for expanding print data from an upper layer device into image data according to predetermined control data, a printing unit for printing the image data on a recording medium according to predetermined process condition control data, and a recording medium conveyor for transporting the medium to the print unit are combined. The expansion unit includes a conversion process unit for receiving an image quality request instruction from an external device and a medium specifying instruction specifying a type of the recording medium transported by the recording medium conveyor, a rational data unit for storing a plurality of expansion control data items and identifying an expansion control data item corresponding to each instruction, and a rational process condition unit for storing a plurality of process condition control data items and identifying a process condition control data item corresponding to each instruction.

18 Claims, 3 Drawing Sheets

FIG. 2

| REQUEST IMAGE QUALITY LEVEL / RECORDING MEDIA | STANDARD IMAGE QUALITY | HIGH QUALITY | BLOCK COPY | ENERGY SAVING |
|---|---|---|---|---|
| STANDARD PPC | RATIONALIZATION 1-1 | 1-2 | — | 1-4 |
| REPRODUCED PPC | 2-1 | 2-2 | — | 2-4 |
| THICK PAPER (POSTCARD, ETC.) | 3-1 | — | — | 3-4 |
| BOND PAPER | 4-1 | 4-2 | — | 4-4 |
| OHP SHEET | 5-1 | 5-2 | — | 5-4 |
| BLOCK COPY SHEET | 6-1 | 6-2 | 6-3 | — |
| ENVELOPE | 7-1 | — | — | 7-4 |

ELECTROPHOTOGRAPHIC DIGITAL PRINTER HAVING DATA EXPANSION MEANS RESPONSIVE TO DESIRED IMAGE QUALITY AND TYPE OF RECORDING MEDIUM USED

BACKGROUND OF THE INVENTION

The present invention generally relates to a printer, and particularly, to a digital printer using an electrophotographic process adaptive to the type of a recording medium.

DESCRIPTION OF THE RELEVANT ART

It is desirable for the printer using an electrophotographic process to reproduce a video image with a desired level of image quality in accordance with the type of a recording medium on which the video image is to be printed.

Recent developments of digital processing techniques have allowed a variety of digitized data to be processed in the printer using an electrophotographic process, so that the electrophotographic process can output a sequence of digitally processed data to form an electrophotographic image on a variety of recording media.

A recent digital printer with an electrophotographic process is implemented even for an image quality mode at a level to permit a significant image to be formed with an effectively reduced toner consumption.

In this printer, the electrophotographic process has a number of variable parameters for an adaptive control when e.g. the kind of a recording medium is changed.

However, such the process parameters are designed simply in consideration of printing techniques. For example, in adaptation for an overhead projector (hereafter "OHP") sheet employed as a recording medium, there are varied working conditions of a printing mechanism, such as an electric field in an image transfer section or a speed, temperature, pressure and recording-medium carrying angle of an image fixing section. Also the mode change of image quality is effected by simply varying, e.g. reducing to a half, the number of repeated times of an exposure of a photosensitive member to rays of light from an optical system.

Moreover, the Japanese Patent Application Laid-Open Publication No. 4-153671 has disclosed a printing technique, in which a surfacial electric resistance of a recording medium is detected as a parameter for controlling a potential of a guide member of the recording medium in a vicinity of an image transfer section to prevent undesirable image density variations due to chagnes in working conditions.

Further, the Japanese Patent Application Laid-Open Publication No. 4-204780 has disclosed another technique, in which a corona discharger employed for transfer of a toner image onto a surface of an object material is disposed in a nip region, where a photosensitive member contacts an image transfer belt, to prevent toner particles from adhering outside of an image region that otherwise might have a blur of toner therearound.

However, such conventional image processing techniques are based on a concept of selecting a simple combination of parameters for controlling various local points of a printing mechanism, thus unsuccessfully achieving an image quality control adaptive to a characteristic of a recording medium with a purpose-dependent quality level.

Accordingly, there is sometimes selected a combination of control parameters for an image quality too high to pratically achieve on a recording medium in use, needing an extra time for a data processing, without a significant increase in level of image quality.

In this respect, even when a processing of print data is set up for an adequate accuracy, it may be difficult to achieve a purpose-dependent high image quality if a processing of image data is inconsistent with the characteristic of the recording medium in use.

The present invention has been achieved with such points in mind.

SUMMARY OF THE INVENTION

It therefore is an object of the present invention to provide a digital printer using an electrophotographic process permitting an image to be printed on a recording medium with a required quality depending on a type of the recording medium.

To achieve the object, a genus of the present invention provides a printer comprising: a data expanding means responsible for a combination of a first command representative of an external request for an image quality and a second command representative of a designated type of a recording medium to execute a data expansion for expanding a set of print data from an upper layer device into a set of image data, the data expanding means including a first adaptation means responsive to the combination of the first and second commands to select one of a plurality of sets of first control data stored therein for controlling the data expansion and a second adaptation means responsive to the combination of the first and second commands to select one of a plurality of sets of second control data; an image printing means responsive to the selected set of second control data to be driven for printing on the recording medium an image according to the set of image data; and a medium conveying means for conveying the recording medium via the image printing means.

According to a species of the genus of the invention, the data expanding means stops the data expansion when none of the plurality of sets of first control data corresponds to the combination of the first and second commands and provides an external display for notifying an impossibility of printing an image in response to the combination of the first and second commands when the data expansion is stopped.

According to another species of the genus of the invention, the selected set of first control data contains a control data on at least one of a tone, a resolution, a line number and an on-off selection of an edge smoothing of the image to be printed on the recording medium.

According to another species of the genus of the invention, the selected set of second control data contains a control data on at least one of a charging condition, an electrostatic latent image forming condition, a developing condition, a transfer condition and a fixing condition of the image to be printed on the recording medium.

According to another species of the genus of the invention, the image printing means comprises a photosensitive member, an optical system for forming an electrostatic latent image on the photosensitive member, a development section for attaching a developing material to the electrostatic latent image on the photosensitive member, a transfer roller for transferring the developing material from the photosensitive member onto the recording medium, and a fixing section for fixing the developing material on the recording medium, and the selected set of second control data contains a control data on at least one of a light intensity of the optical system for the photosensitive member to be exposed, a developing electric field for transfer of the developing material to an electrostatic latent image on the photosensitive member, an electric field for the transfer of the developing material and a combination of a speed and a pressure for the fixing of the developing material.

According to another species of the genus of the invention, the image printing means comprises a dielectric member, a latent image forming section for forming an electrostatic latent image on the dielectric member, a development section for attaching a developing material to the electrostatic latent image on the dielectric member, a transfer roller for transferring the developing material from the dielectric member onto the recording medium, and a fixing section for fixing the developing material on the recording medium, and the selected set of second control data contains a control data on at least one of a developing electric field for transfer of the developing material to an electrostatic latent image on the photosensitive member, an electric field for the transfer of the developing material and a temperature for the fixing of the developing material.

In other words, according to the present invention, the object is achieved, as follows.

A printer according to the invention comprises a first means including an expansion means for expanding print data from an upper layer device into image data according to an expansion control data of which a value is preset, a printing means for printing the image data on a recording medium according to a process condition control data of which a value is preset, and a recording medium conveying means for transporting the recording medium to the printing means.

Additionally, the expansion means includes a conversion process means for receiving an image quality request instruction from an external device and a medium specifying instruction specifying a type of the recording medium transported by the recording medium conveying means, a rational data means for storing therein a plurality of expansion control data items and identifying an expansion control data item corresponding to each of the instructions, and a rational process condition means for storing therein a plurality of process condition control data items and identifying a process condition control data item corresponding to each of the instructions.

In the first means, the image quality request instruction from an external device instructs, for example, a standard image quality, a higher image quality, an image quality for a block copy, or an energy saving image quality.

Moreover, the medium specifying instruction instructs one of e.g. standard PPC paper, reproduced PPC paper, thick paper for postcards or the like, bond paper, OHP sheet, block copy paper, or paper of envelope, etc.

In accordance with the printer of the present invention, there is provided a second means including the configuration of the first means in which the rational data means includes an expansion interruption control means for achieving an interruption control of the expansion process when there is missing in the rational data means an expansion control data item corresponding to the instruction and an error notifying means for notifying a message to an external device when the process of the expansion means is interrupted by the expansion interruption control means, the message indicating that the print operation is impossible with the combination of the respective instructions.

The printer of the present invention includes a third means including the structure of the first means in which the rational process condition means possesses the process condition control data specifying at least one of the conditions including a charging condition, an electrostatic latent image creating condition, a developing condition, a transfer condition, and a fixing condition.

In accordance with the printer of the present invention, there is provided a fourth means including the construction of the first means in which the rational data means possesses the expansion control data including at least one of data specifying a number of gradation levels, data specifying a resolution, data specifying the number of lines, and data specifying an on/off of edge smoothing process.

In accordance with the present invention, the printer includes a fifth means including the constitution of the first means in which the printing means includes a photoconductor, an optical system for forming on the photoconductor an electrostatic latent image by an optical exposing operation, a developer for attaching an developing material onto the electrostatic latent image on the photoconductor, a transfer roller for transferring to the recording medium the developing material attached onto the photoconductor by the developer, and a fixer for fixing the developing material attached onto the recording medium.

Moreover, the rational process condition means possesses the process condition control data including at least one selected from exposure intensity control data for the optical system, developer electrostatic field control data for the devloper, transfer electrostatic field control data for the transfer roller, and fixing control data specifying a fixing speed and a fixing pressure for the fixing unit.

The printer in accordance with the present invention includes a sixth means in which the printing means includes a dielectric substance, a static charging means for electrostatically generating an electrostatic latent image on the dielectric substance, a developer for attaching a developing material onto the electrostatic latent image on the dielectric substance, a transfer roller for transferring to the recording medium the developing material attached onto the dielectric substance by the developer, and a fixer for fixing the developing material attached onto the recording medium.

Furthermore, the rational process condition means possesses the process condition control data including at least one selected from, developer electrostatic field control data for the developer, transfer electrostatic field control data for the developer and fixing temperature control data for the fixing unit.

In the first means, the change process means receives an image quality request instruction and a medium specifying instruction from an external device. These items are recorded as a control code in print data from a higher-level unit or inputted from an operator's panel or the like. On receiving the instructions, the change process section is enabled to receive ordinary print data. When print data is received from an upper layer device, the expansion means expands the print data into image data.

In this situation, the rational data means identifies expansion control data therein according to the respective instructions. In response thereto, the expansion means carries out an expansion process for the print data under a condition corresponding to the instructions. The means then outputs the image data to the print means.

In the printing means, the image data is printed on the recording medium. During this operation, the rational process condition means determines process condition control data therein according to the instructions. The printing means then prints the image data on the recording medium according to the process condition control data.

Therefore, the image data is printed on the medium associated with the medium specifying instruction under a condition related to the image quality request and medium specifying instruction.

In the second means, when the rational data means identifies expansion control data according to the respective instructions, if there is missing expansion control data related to the instructions, the rational data means invokes an expansion stop function to stop the expansion process.

Subsequently, when the process of the expansion means is halted by the expansion stop means, the condition that the print operation is disabled due to the combination of the instructions is notified to an external device.

Namely, when the recording medium specification mismatches the requested image quality and the combination thereof cannot be executed, the system stops the print operation and displays the pertinent error on an external device.

BRIEF DESCRIPTION OF THE DRAWINGS

The objects and features of the present invention will become more apparent from the consideration of the following detailed description taken in conjunction with the accompanying drawings, in which:

FIG. 2 is a diagram for explaining a group of rational processes decided according to recording medium types and requested image quality levels.

DESCRIPTION OF THE PREFERRED EMBODIMENTS

Figure 1:
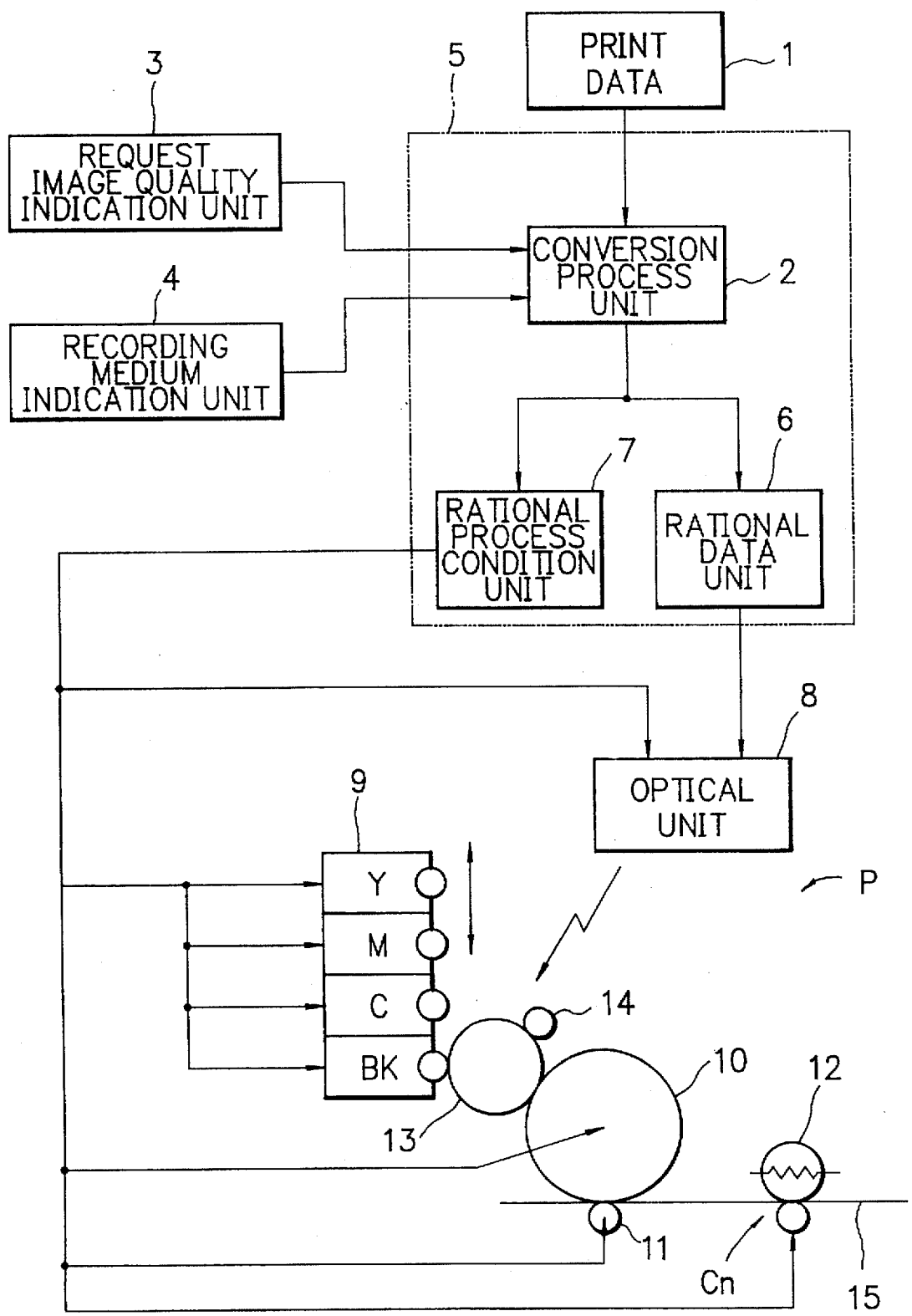
FIG. 1 is a schematic diagram showing the construction of an image reproducing device in a first embodiment in accordance with the present invention.
Figure 3:
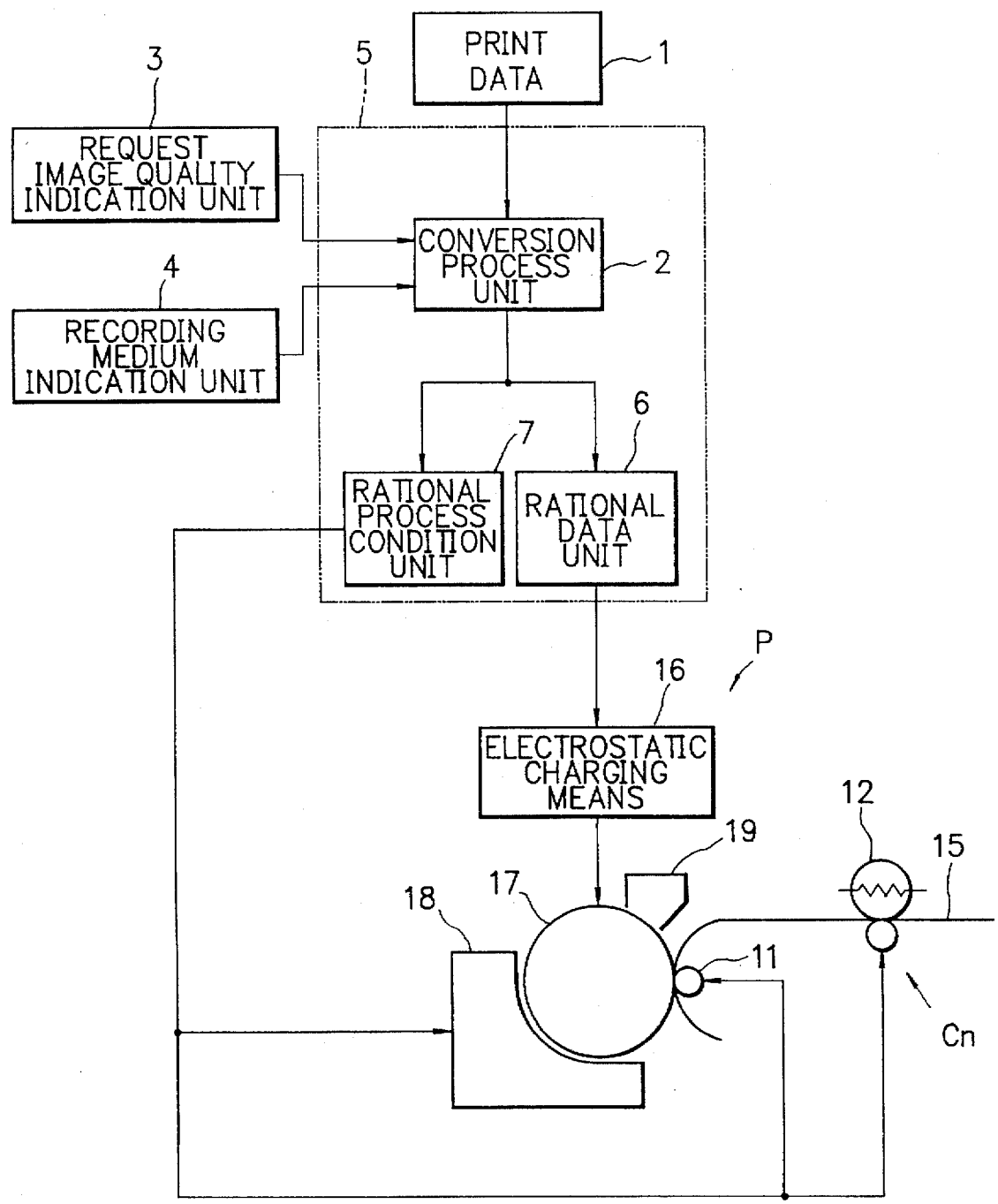
FIG. 3 is a diagram showing structure of an image creating device in a second embodiment in accordance with the present invention.

Referring now to FIGS. 1 to 3, description will be given of embodiments of the printer in accordance with the present invention. Like members are designated by like reference characters.

FIG. 1 shows constitution of the first embodiment of the printer in accordance with the present invention.

In the printer, a set of print data 1 is supplied from a host computer as an upper layer device. The print data 1 is expanded by expansion means 5 into image data. The data is then transmitted via a rational data unit 6 to an optical unit (system) 8 constituting a printing section.

The print data is sent to a conversion process unit 2 to be transformed into rational data according to instructions respectively from a request image quality indication unit 3 and a recording medium indication unit 4.

According to an instruction from an external device, the request image quality indication unit 3 indicates a request image quality to the conversion process unit 2.

In response to the instruction, the recording medium indication unit 4 indicates a type of the recording medium to the conversion process unit 2.

The rational data unit 6 then identifies expansion control data according to the instructions supplied to the conversion process unit 2. The unit 6 includes a memory in which types of recording medium and expansion control data items corresponding to request print quality levels are beforehand stored.

Additionally, the image data created from the expansion means 5 is stored in the unit 6 such that print data attained by rationalizing the image data is transmitted to the optical unit 8.

In a rational process condition unit 7, there is conducted a drive control operation according to process condition control data so that the optical unit 8, a color developer 9, an intermediate transfer drum 10, a transfer roller 11, and a fixing unit 12 operate under appropriate processing conditions.

The optical unit 8 includes an exposing section to expose a photoconductor 13 to light according to the image data from the rational data unit 6.

Prior to this operation, the photoconductor 13 is uniformly charged by a charging unit 14. The exposed photoconductor 13 is sequentially developed by developing materials respectively of four colors cyan (C), magenta (M), yellow (Y), and black (BK) in a color developer 9 in which these materials are conveyed by a transporting unit configured in the form of an elevator.

The intermediate transfer drum 10 is used for the intermediate transfer of the image developed on the photoconductor 13 and then the transfer roller 11 transfers the image from the drum 10 onto a print sheet 15 at a time. The fixing unit 12 fixes the transferred image on the sheet 15. P is a printing mechanism including the members 8–14, Cn is a recording medium conveying mechanism for conveying the recording medium 15 via the printing mechanism P.

Subsequently, description will be given of operation of the printer in accordance with the first embodiment shown in FIG. 1.

Assume that "bond paper" is inputted as an indication of the type of recording medium to the medium indication unit 4 from an operator's panel, not shown, of the printer. The unit 4 then notifies the conversion process unit 2 that the next recording medium for image creation is "bond paper".

On the other hand, assume that "high quality level" is requested as the image quality level to the request picture image indication unit 3 from the operator's panel. The unit 3 then indicates the conversion process unit 2 that the next image quality level desired for image production is "high quality level".

The rational data unit 6 identifies expansion control data according to the recording medium specification "bond paper" and image quality indication "high quality level". On the other hand, the rational process condition unit 7 identifies process condition control data.

FIG. 2 exemplifies a group of rational processes decided in relation to the recording medium kinds and request image quality levels.

The specific contents of these processes are stored as expansion control data and process condition control data respectively in the rational data unit 6 and rational process condition unit 7.

The data may be beforehand generated when the printer of the embodiment is manufactured. Alternatively, the control data may be received from an upper layer device.

Additionally, it is also possible to configure the system to receive the control data from a read-only memory (ROM) card or the like.

As can be seen from FIG. 2, some combinations of recording medium types and request image quality levels cannot be actually executed by the system. On this occasion, the rational data unit 6 presents the condition on such a device of the printer as a display panel to request the operator to input appropriate indications again.

In this embodiment, rationalization 4-2 is selected from the table of FIG. 2 to be executed by the expansion unit 6 and print unit.

Specifically, the reference states respectively of the exposure position, exposure amount, transfer condition, and fixing condition are set to appropriate values.

Incidentally, the reference state is associated with a situation in which the recording medium is the standard PPC paper and the request image quality level is the standard image quality level.

When using the bond paper, since the paper thickness thereof is larger than that of the standard PPC paper and the surface thereof is coarser, these conditions are first taken into consideration. Furthermore, for the high quality level requested, there is additionally prepared a specific process associated therewith.

According to the control data, the image creation is not conducted solely with minimum dots of the printer in the low-density picture area. Namely, the low-density area is reproduced with a plurality of pixels.

Moreover, the minimum density value and minimum line width are set to values respectively exceeding the standard values respectively thereof.

In this connection, the standard values are employed in the case in which the recording medium is the standard PPC paper and the request image quality level is the standard image quality level.

Furthermore, in addition to the operation above, the quantity of developing material of each color is increased for the final developing process to obtain the requested high-quality level. Additionally, there are conducted processes to appropriately transfer and to fix the obtained image onto the recording medium.

In the embodiment, the rational data unit 6 is adopted to store therein expansion control data indicating the contents of changes for the reproduction contents by plural dots in the low-density picture area and the contents of exposure data for final color developing.

Stored in the rational process condition unit 7 are process condition control data indicating the increase in the exposure power for the low-density picture area and minimum line width reproduction, transfer condition to transfer final developing color materials onto the intermediate transfer drum, and the condition to transfer an image onto bond paper at a time and the condition to fix the image.

In the operation to transfer the final color image onto the intermediate transfer drum 10 and the operation to transfer the image on the recording medium, i.e., print sheet 15 at a time, the intensity of transfer electric field is increased, whereas the fixing speed and pressure are decreased and increased, respectively.

When the picture creation is commenced in a picture creation process engine unit, not shown, the rational data unit 6 and rational process condition unit 7 sequentially feed appropriate data and process conditions to the optical unit 8 such that the photoconductor 13 is exposed to light for the first developing color to form a latent image so as to develop the image of the first developing color.

The image developed by the first developing color is then transferred from the photoconductor 13 onto the intermediate transfer drum 10.

Thereafter, images of other developing colors are sequentially transferred onto the drum 10 in a superimposing manner. When the image of the final developing color is developed on the photoconductor 13, the transfer bias used in the transfer of the image onto the drum 10 is altered.

Subsequently, in the transfer of image onto the print sheet 15 at a time, the bias applied to the transfer roller 11 is adjusted to a proper value to transfer the image onto the sheet 15.

The sheet 15 is then conveyed to the fixing unit 12. Decreasing the fixing speed by 25% and increasing the fixing pressure by 10%, the image is fixed onto the sheet 15 and then the sheet 15 is ejected from the printer.

In this manner, a high-quality picture can be printed on a sheet of bond paper. In this description, there are specified a sheet of bond paper and a high image quality level. However, the printer is applicable to any combinations of FIG. 2, namely, the print operation can be accomplished according to the expansion control data and process condition control data shown in FIG. 2.

FIG. 3 shows the construction of the printer in the second embodiment in accordance with the present invention.

In the second embodiment, the latent image creating and keeping unit includes a dielectric drum 17. As latent image forming means, there is provided an electrostatic charging means 16 for the application of static charge. The means 16 concretely includes an electrostatic recording head. The system further includes a developer 18 for one color and a cleaner 19. There is missing the intermediate transfer drum. P is a printing mechanism including members 11–12 and 16–19, Cn is a recording medium conveying mechanism for conveying a recording medium 15 via the printing mechanism P.

Referring next to FIG. 3, description will be given of the printer in accordance with the second embodiment.

Assume that "reproduced PPC paper" is specified as data indicating the recording medium to the recording medium indiction unit 4 and "block copy level" is denoted as the request image quality level to the request image quality indication unit 2.

In this situation, in the contents of the group of rational processes shown in FIG. 2, there is missing an executable rational process simultaneously satisfying the conditions of "reproduced PPC paper" and "block copy level".

Therefore, the rational data unit 6 cannot identify expansion control data and hence notifies the unacceptable condition on, for example, a display panel, not shown.

In response thereto, when "energy saving level" is designated as the request image quality level, the unit decides that the combination thereof with "reproduced PPC paper" is feasible and identifies expansion control data.

According to the data, the expansion means 5 executes a process associated with rationalization 2-4 shown in FIG. 2.

In this regard, since the image generation process varies between the first and second embodiments, the rational processes of FIG. 2 also vary therebetween.

In this embodiment, since the picture creation is accomplished on a sheet of reproduced PPC paper in the energy saving mode, the conversion process unit 2 conducts a rationalizing operation to produce an image which can be at least recognized by the static charging means 16 and in the subsequent processes.

The specific contents of rationalization includes, for example, the skipping of image edge smoothing process, deletion of image gradation levels, simplification of text style for characters, etc., reduction in number of picture dots, reduction in quantity of the developing material transferred by the developing member to the electrostatic latent image on the photosensitive member, associated reduction of electric field of the transfer roller, decrease by 10% of fixing temperature, and minimization of energy consumption by elongating interval of time between power-on operations of the heater.

In the embodiment of FIG. 3, the contents of processes associated with the electrostatic charging means 16 are delivered to the rational data unit 6 and the process contents related to other process conditions are supplied to the rational process condition unit 7.

When the picture generation is initiated by an image creation process engine unit, not shown, the print data is fed from the rational data unit 6 to the electrostatic charging means 16 such that a latent image thereof is formed on the dielectric substance of the drum 17.

Subsequently, the process conditions are set to the developer 18, transfer roller 11, and fixing unit 12 by the rational process condition unit 7. In this fashion, there is generated an image at an energy saving level on a sheet of the reproduced PPC paper.

In the description above, the picture generation is conducted according to the combination of "reproduced PPC Paper" and "energy saving level". However, it is to be appreciated that the rationalizing operation can be appropriately carried out for various combinations of FIG. 2 in the embodiment.

Description has been given of the above embodiments in accordance with the present invention. The present invention however is not restricted by the embodiments.

According to the request image quality level and recording medium kind indication, the expansion means 5 can accomplish various modifications for each specified item or for the specified indications in combination.

Additionally, when only one of the request image quality level and recording medium kind is specified is or indications of both thereof are missing, the standard image quality level and standard PPC paper are specified respectively for the request image quality level and recording medium kind.

Furthermore, the charging, exposing, developing, transferring, and fixing sections as well as the latent image generating means are set to the respective rational states for the picture creation process according to the combination of the standard image quality level and standard PPC paper.

In this connection, the data items to be supplied respectively to the request image quality indication unit 3 and recording medium indication unit 4 may be inputted not only from the operator's panel of the printer but also from the host computer side transmitting print data to the printer.

Moreover, the data to the recording medium indication unit 4 may be supplied thereto according to results of detection of the recording medium type by a sensor provided in the recording medium conveying system.

Thanks to the functions of the configuration in accordance with the present invention, since the rational data unit identifies expansion control data on the basis of the respective instructions, the expansion means can carry out the expansion process for the print data under a condition corresponding to the image quality request instruction and medium specifying instruction and the rational process condition unit identifies process condition control data according to the respective instructions.

Therefore, the print section can accomplish the printing operation of image data on a recording medium associated with the pertinent medium specifying instruction under a condition related to the the image quality request instruction and medium specifying instruction.

Namely, the expansion process is effected according to the respective instructions and then the data printing operation is accomplished also on the basis of the instructions.

In consequence, it is possible to remarkably minimize the disadvantageous difference in image quality due to recording medium conventionally taking place in the prior system in which the image creation is conducted under a uniform condition regardless of the recording medium type.

In addition, since the expansion process and operation of the print section are supervised according to the rationalized process condition related to the request image quality level, there can be provided a printer satisfactorily capable of creating a picture having a desired image quality for any types of recording medium, which has been impossible in accordance with the conventional technology.

Moreover, for an image quality request unfeasible in relation with the characteristic of the pertinent recording medium, the executability of image generation can be notified prior to the expansion of image data.

In consequence, the period of time to be consumed for the unnecessary image output operation and print data processes can be dispensed with.

Furthermore, it is possible to beforehand prevent an image other than the desired one from being outputted to the user. This advantageously leads to reduction in the picture production cost and time.

Additionally, when storing the rationalized process conditions obtained according to the recording medium kind and request image quality level in the rational condition unit, the contents related to the expansion means are stored in the rational data unit, and those associated with the driving operation of the printing unit are stored in the rational process condition unit.

Consequently, the control contents are separated in the execution of the picture creation process and hence there is provided a high-speed and high-precision control operation for a picture production engine operating at a high speed and with a high precision.

Furthermore, in accordance with the present invention, since the features thereof need only be added to the existing engine process with a few modifications in the printer configuration, there can be provided a printer capable of developing novel features to cope with various situations and needs, the printer being implemented with a little additional cost.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A printer for recording on a recording medium, comprising:
   a data expanding means for executing a data expansion by expanding a set of print data from an upper layer device into a set of image data in response to a combination of a first command and a second command, said first command corresponding to an external request for an image quality level and said second command corresponding to a type of recording medium, the data expanding means including:
   a first adaptation means, responsive to the combination of said first command and said second command, for selecting one of a plurality of sets of first control data stored in said first adaptation means for controlling the data expansions and
   a second adaptation means, responsive to the combination of said first command and said second command, for selecting one of a plurality of sets of second control data;
   an image printing means, responsive to the set of second control data selected by said second adaptation means, for printing on the recording medium an image according to the set of image data; and a medium conveying means for conveying the recording medium to said image printing means.

2. The printer according to claim 1, wherein the data expanding means stops the data expansion when none of the plurality of sets of first control data corresponds to the combination of said first command and said second command and provides an external display for providing notification of an impossibility of printing an image in response to the combination of said first command and said second command, when the data expansion is stopped.

3. The printer according to claim 1, wherein the set of first control data selected by said first adaptation means contains control data selected from the group consisting of: a tone, a resolution, a line number, and an on-off selection of an edge smoothing of the image to be printed on the recording medium.

4. The printer according to claim 1, wherein the set of second control data selected by said second adaptation means contains control data selected from the group consisting of: a charging condition, an electrostatic latent image forming condition, a developing condition, a transfer condition, and a fixing condition of the image to be printed on the recording medium.

5. The printer according to claim 1, wherein the image printing means comprises:

a photosensitive member;

an optical system for forming an electrostatic latent image on said photosensitive member;

a development section for attaching a developing material to said electrostatic latent image on said photosensitive member;

a transfer roller for transferring said developing material from said photosensitive member onto the recording medium; and a fixing section for fixing said developing material on the recording medium;

wherein the set of second control data selected by said second adaptation means contains control data selected from the group consisting of: a light intensity of said optical system as delivered to said photosensitive member to be exposed, a developing electric field strength, an electric field strength for the transfer of said developing material, and a combination of a speed and a pressure for the fixing of said developing material.

6. The printer according to claim 1, wherein the image printing means comprises:

a dielectric member;

a latent image forming section for forming an electrostatic latent image on said dielectric member;

a development section for attaching a developing material to said electrostatic latent image on said dielectric member;

a transfer roller for transferring said developing material from said dielectric member onto the recording medium; and a fixing section for fixing said developing material on the recording medium;

wherein the set of second control data selected by said second adaptation means contains control data selected from the group consisting of: a developing electric field strength, an electric field strength for the transfer of said developing material, and a temperature for the fixing of said developing material.

7. A printer for recording on a recording medium, comprising:

an expansion means for expanding print data from an upper layer device into image data according to expansion control data;

a printing means for printing said image data on the recording medium according to process condition control data; and a conveying means for conveying the recording medium to said image printing means;

wherein said expansion means includes:

data means for storing a plurality of expansion signals and identifying one of said plurality of expansion signals, to be provided to said expansion means as said expansion control data, based upon an image quality request signal specifying a level of image quality and a medium specifying signal specifying a type of recording medium conveyed by said conveying means; and process condition means for storing a plurality of process condition signals and identifying one of said plurality of process condition signals, to be provided to said printing means as said process condition control data, based upon said image quality request signal and said medium specifying signal.

8. The printer according to claim 7, wherein said medium specifying signal is received from an external device.

9. The printer according to claim 7, further comprising:

an operator panel for receiving operator input of said medium specifying signal.

10. The printer according to claim 7, further comprising:

a sensor means, attached to said conveying means, for detecting a medium type of the recording medium to generate said medium specifying signal.

11. The printer according to claim 7, wherein said image quality request signal is received from an external device.

12. The printer according to claim 11, wherein said medium specifying signal is received from an external device.

13. The printer according to claim 11, further comprising:

an operator panel for receiving operator input of said medium specifying signal.

14. The printer according to claim 11, further comprising:

a sensor means, attached to said conveying means, for detecting a medium type of the recording medium to generate said medium specifying signal.

15. The printer according to claim 7, further comprising:

an operator panel for receiving operator input of said image quality request signal.

16. The printer according to claim 15, wherein said medium specifying signal is received from an external device.

17. The printer according to claim 15, further comprising:

an operator panel for receiving operator input of said medium specifying signal.

18. The printer according to claim 15, further comprising:

a sensor means, attached to said conveying means, for detecting a medium type of the recording medium to generate said medium specifying signal.

* * * * *